United States Patent [19]

Kuzma

[11] 4,225,024
[45] Sep. 30, 1980

[54] LOCKING DEVICE FOR REVERSE GEAR OF A MOTOR VEHICLE TRANSMISSION, ESPECIALLY FOR AN AUTOMOBILE

[75] Inventor: Gyözö Kuzma, Dachau, Fed. Rep. of Germany

[73] Assignee: Bayerische Motoren Werke Aktiengesellschaft, Fed. Rep. of Germany

[21] Appl. No.: 882,333

[22] Filed: Mar. 1, 1978

[30] Foreign Application Priority Data

Mar. 2, 1977 [DE] Fed. Rep. of Germany ....... 2708999

[51] Int. Cl.² ............................................. F16D 23/06
[52] U.S. Cl. ................................... 192/53 F; 74/339
[58] Field of Search ....................... 192/53 F; 74/339

[56] References Cited
U.S. PATENT DOCUMENTS 2,253,578  8/1941  Peterson et al. .................. 192/53 E
2,389,490  11/1945  Dugas ................................ 192/53 F
2,942,712  6/1960  Altmann ....................... 192/53 F X Primary Examiner—Allan D. Herrmann
Attorney, Agent, or Firm—Craig & Antonelli

[57] ABSTRACT

A locking device for a motor vehicle transmission which includes a friction ring brought into frictional engagement with a gear wheel when engaging a reverse gear. The friction ring cooperates with a dog which is spring-loaded in an axial direction. The dog selectively displaces locking elements into a locking position for preventing engagement of the gear wheel. The friction ring is disposed non-rotatably and slidably on a driven shaft of the transmission between the gear wheel and the dog with the gear wheel being freely rotatable with respect to the driven shaft and adapted to be coupled to the driven shaft. The dog is disposed coaxially with respect to the driven shaft on integral portions of the transmission housing.

9 Claims, 5 Drawing Figures

LOCKING DEVICE FOR REVERSE GEAR OF A MOTOR VEHICLE TRANSMISSION, ESPECIALLY FOR AN AUTOMOBILE

The present invention relates to a locking arrangement and, more particularly, to a locking device for a reverse gear of a transmission for motor vehicles, especially automobiles, wherein a friction ring, brought into a frictional contact with a change gear when reverse gear is engaged, cooperates with a dog, spring-loaded in an axial direction, which shifts locking elements into a locked position for preventing shifting of the change gear.

A transmission with a locking device of the aforementioned type has been proposed, for example, in German Auslegeschrift No. 2,018,399. In this proposed transmission, when reverse gear is engaged, a gear freely rotatably mounted on a countershaft is initially meshed with a gear which is non-rotatably connected with a layshaft with a locking device being associated with the shiftable intermediate gear. If the layshaft has a rotational direction corresponding to a forward gear, when the intermediate gear is engaged, the friction ring acting on the engaged intermediate gear brings locking elements of a locking device into a locking position by means of a dog, whereby the locking device prevents the intermediate gear from being shifted up to the gear which is non-rotatably mounted on the driven shaft. The intermediate gear can only be shifted when the drive shaft and intermediate gear have been braked to a stop.

In the proposed transmission, when a clutch has been released to engage reverse gear between the drive unit and the transmission, and with the vehicle in motion, the intermediate gear, which has been braked to a stop, can be meshed with the rotating gear, turning with the driven shaft under the influence of rolling drive wheels of the motor vehicle. However, such proposed construction is disadvantageous in that shifting noises result and also damage to the reverse gears may occur.

The aim underlying the present invention essentially resides in providing a transmission having an improved locking device which prevents engagement of a reverse gear of the transmission unless a driven shaft is at rest or essentially at rest.

According to one feature of the present invention, a friction ring is disposed on the driven shaft of the transmission in a non-rotatable manner with the friction ring being slidably movable between a gear wheel freely rotatably mounted on the driven shaft which can be coupled to the driven shaft and a dog disposed coaxially with respect to the driven shaft on integral parts of a transmission housing.

In motor vehicles with conventional transmissions, the reverse gear wheel mounted on the driven shaft is continuously in mesh with the layshaft by way of an intermediate gear so that the gear wheel has the necessary rotational direction to allow the motor vehicle to travel in reverse.

According to the present invention, with a motor vehicle rolling forward so that the driven shaft is turning in a direction opposite to that of the gear wheel for reverse gear, engagement of reverse gear is reliably prevented and the reverse gear can only be engaged with the driven shaft being essentially at rest, whereby shifting noises and damage to the transmission are advantageously avoided.

With a motor vehicle rolling backward so that the direction of rotation of the driven shaft corresponds to that of the gear wheel, the present invention provides extensive synchronization of the gear wheel and driven shaft in an advantageous manner when reverse gear is engaged.

According to further features of the present invention, the dog is slidably connected with a sleeve firmly mounted on a neck portion of the transmission housing with the sleeve being provided with openings delimited by guide surfaces for locking elements such as, for example, ball-shaped members interposed between the housing neck portion and a portion of the dog which is provided with depressions for accommodating the ball-shaped members.

In accordance with the present invention, each opening is provided with an axially directed guide surface and a further guide surface adjoining the axially directed guide surface and extending in a circumferential direction, according to the direction of rotation of the driven shaft corresponding to a forward movement of the motor vehicle. A locking surface adjoins the circumferentially extending guide surface and extends, at least over a first linear portion thereof, diagonally from such guide surface.

In accordance with yet further features of the present invention, the gear wheel, during a shifting process, is brought into frictional engagement with the friction ring by means of frictional surfaces provided on inner and outer cones of the gear wheel and friction ring, respectively. The frictional engagement of the gear wheel and friction ring displaces the dog disposed on the outer circumference of the neck portion, when the locking device is ineffective, in an axial direction against the resistance of helical compression springs, whereby the gear wheel meshes into bevel gearing of a coupling or clutch ring non-rotatably mounted on the driven shaft with the friction ring being disposed on the coupling or clutch ring.

According to the present invention, the gear wheel may be provided with an elongated hub having bevel gearing disposed on an outer circumference thereof for a sliding sleeve which is provided with a frictional surface disposed on an outer cone thereof so as to engage a conical-surface friction ring which is disposed on a coupling ring of the driven shaft. The coupling ring is disposed adjacent to the gear wheel hub and cooperates with a frictional surface provided on an inner cone with the frictional surface being located on the inner circumference of the housing neck of a movably mounted dog.

In accordance with further developments of the present invention, the gear wheel may be provided with a coupling element for a sliding sleeve of a shift coupling disposed between the reverse gear wheel and a gear of a forward speed. The sliding sleeve cooperates with a first conical ring by way of a frictional surface. The conical ring is non-rotatably connected with a second conical ring disposed on a side of the gear wheel facing the housing neck by means of pins axially displaceably mounted in axially extending openings in the gear wheel. When shifting, the second conical ring is brought into frictional engagement with an inner cone on a friction ring with the friction ring, in turn, cooperating by an outer cone with a dog disposed on the inner circumference of the housing neck.

Accordingly, it is an object of the present invention to provide a locking device for a transmission which avoids, by simple means, the shortcomings and disadvantages encountered in the prior art.

Another object of the present invention resides in providing a locking device for a transmission which is simple in construction and, therefore, inexpensive to manufacture.

An additional object of the present invention resides in providing a locking device for a transmission which functions reliably under all operating conditions.

A further object of the present invention resides in providing a locking device for a transmission which minimizes, if not completely avoids, the occurrence of any shifting noises.

Yet another object of the present invention resides in providing a locking device for a transmission which minimizes damage to reverse gears in the transmission during a shifting operation.

These and other objects, features and advantages of the present invention will become more apparent from the following description when taken in connection with the accompanying drawings which show, for the purposes of illustration only, several embodiments in accordance with the present invention, and wherein.

Figure 1:
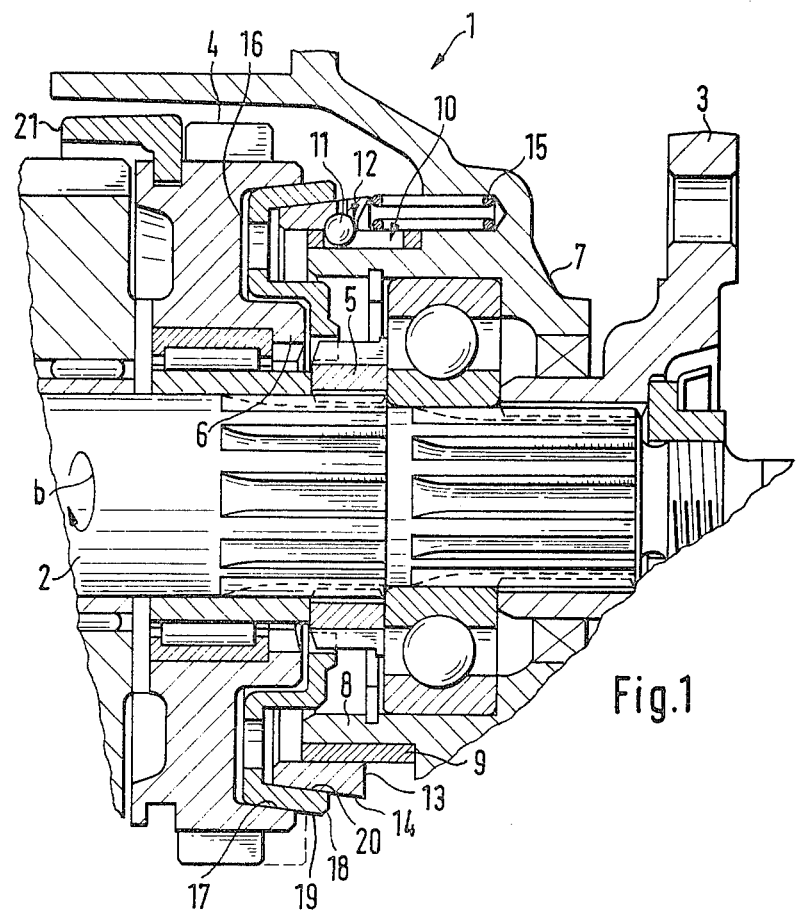
FIG. 1 is a partial axial cross-sectional view of a first embodiment of a transmission in accordance with the present invention.

Referring now to the drawings wherein like reference numerals are used throughout the various views to designate like parts and, more particularly to FIG. 1, according to this figure, a transmission generally designated by the reference numeral 1 for a motor vehicle such as, for example, an automobile, is provided which includes a driven shaft 2 adapted to be firmly connected by a flange 3 with a drive shaft operatively connected to drive wheels of the motor vehicle. The transmission 1 is provided with a conventional gearbox for reverse gear which includes a gear wheel 4 freely rotatably mounted on the driven shaft 2. The gear wheel 4 is also displaceably movably mounted for positive meshing or engagement with a clutch or coupling ring 5 non-rotatably connected to the driven shaft 2. The clutch or coupling ring 5 is provided on an outer circumference thereof with conventional splines associated with corresponding splines gearing on a hub 6 of the gear wheel 4.

Figure 5:
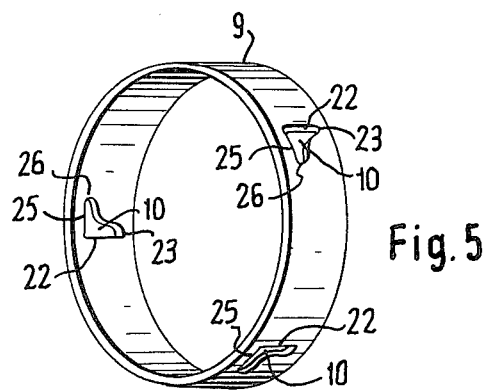
FIG. 5 is a perspective view of the cylindrical sleeve employed in the embodiment of FIGS. 1 and 2.

A neck 8 is provided on a housing 7 of the transmission 1 with the neck 8 being coaxial with respect to the driven shaft 2. A cylindrical sleeve 9 is firmly mounted on a cylindrical outer circumference of the neck 8 with the sleeve 9 being provided with at least one, but preferably a plurality of openings 10 as shown in FIG. 5 which accommodate balls 11 resting against the neck 8 and in depressions 12 of a dog 13 disposed slidably movably on the sleeve 9. The dog 13 is provided with a conically-shaped or tapering frictional surface 14 and is supported against the housing by a plurality of pre-tensioned helical compression springs 15 which bias the dog 13 in an axial direction.

A friction ring 18 is disposed between the gear wheel 4 and dog 13 with the gear wheel 4 being provided with a conically-shaped or tapering frictional surface 17 at an opening 16. The friction ring 18 is provided with a frictional surface 19 operatively associated with the frictional surface 17 of the gear wheel 4 and a frictional surface 20 operatively associated with the frictional surface 14 of the dog 13. The friction ring 18 is non-rotatably and displaceably connected to the clutch or coupling ring 5. The friction ring 18, preferably made from a round blank, is fitted to a step-like shoulder in the opening 16 in the gear wheel 4 with the shoulder being located in a vicinity of a longitudinal axis of the driven shaft 2 so that only a small amount of space is advantageously required.

When the gear wheel 4, which is constantly in mesh with an intermediate gear of the gearbox, is shifted by means of a shifting fork 21 in a direction toward the clutch ring 5 to engage reverse gear, the gear wheel 4 presses friction ring 18 against the dog 13 so that frictional surfaces 17 and 19, as well as 20 and 14, come into engagement. When driven shaft 2 comes to a stop or is essentially stopped, the gears of the gearbox employed for a reverse speed, rotating under zero load when the clutch connection between the drive assembly and transmission 1 is released, are braked by gear wheel 4 against friction ring 18.

Figure 2:
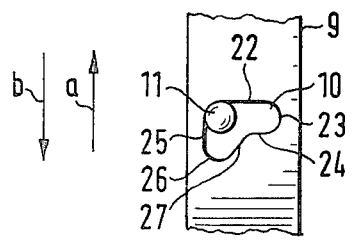
FIG. 2 is a detailed view of a clutching lock arrangement in accordance with the present invention.

The dog 13 is subjected to a slight load in an axial direction by the helical compression springs 15 and, preferably, also in a circumferential direction and, as shown in FIG. 2, the balls 11, which are positively connected with the dog 13, thereby come to rest against an axially directed guide surface 22 which delimits the opening 10. No locking action is produced in this position and the gear wheel 4 can be displaced axially for a positive mesh with the clutch or coupling ring 5. With such a positive mesh between the gear wheel 4 and coupling ring 5, rotation of the drive shaft 2 for reverse travel of the vehicle causes the friction ring 18 to rotate and slide relative to the dog 13 since ring 18 is non-rotatably connected to the coupling ring 5 which, in turn, is non-rotatably connected to the driven shaft 2 as described above. The tapers of the conical friction surfaces 14 and 20 are made relatively large as shown in FIG. 1 so that during reverse travel of the vehicle, which is normally of relatively short duration, jamming of these surfaces is reliably prevented. The amount of axial displacement of the gear wheel 4 is limited in turn by the balls 11, each of which abuts a semi-circular curved surface 23 adjoining the guide surface 22 and essentially accommodating the shape of the balls 11. An additional, but short, axial guide surface 24 adjoins the semi-circular curved surface 23.

As also shown in FIG. 2, the opening 10 is delimited by a guide surface 25 which runs or extends in a circumferential direction and is perpendicular to the guide surface 22. The guide surface 25 terminates in a curved surface 26 which conforms to the shape of the balls 11. A locking surface 27 emerges tangentially from the curved surface 26 and forms an acute angle with guide surface 25 extending in the circumferential direction. The locking surface 27 extends from the guide surface 25 as a transition to the short axial guide surface 24.

If the driven shaft 2 at the beginning of the process of engaging reverse gear has a rotational direction in the direction designated by the arrow b in FIG. 2 which is opposite to the rotational direction a of the gear wheel 4, which is constantly in mesh with the other reverse gear wheels, the locking device prevents a non-rotational connection between the gear wheel 4 and the driven shaft 2 by way of the coupling or clutch ring 5. The friction ring 18, rotating with the driven shaft 2 in the direction indicated by the arrow b, is displaced together with the dog 13, brought into frictional engagement therewith, into rotation in the same direction on the sleeve 9. The rotation of the dog 13 is limited by balls 11 which, by virtue of an initial axial displacement of the dog 13 during the shifting process, come to rest against locking surface 27 and roll along the locking surface 27 into the curved surface 26 up against an end stop.

The locking device operates as long as the driven shaft 2 has a rotational direction corresponding to the arrow b and corresponds to forward travel of the automobile since the shifting force acting on the dog 13 in the axial direction is relatively small relative to the frictional force acting between frictional surface 14 of the dog 13 and frictional surface 20 of the friction ring 18 in the circumferential direction. Thus, inadvertent engagement of reverse gear is reliably prevented in an advantageous manner when the motor vehicle is moving forward.

On the other hand, if the automobile is rolling forward at moderate speed with the clutch released, reverse gear can only be engaged after the vehicle has been braked to a stop. Shifting noise and damage to the reverse gears are thereby advantageously avoided. With the automobile rolling backward and with the clutch disengaged, the friction ring 18 acts largely as a synchronization ring during engagement of the reverse gear, whereby the gear wheel 4 can easily be coupled to the driven shaft 2.

Figure 3:
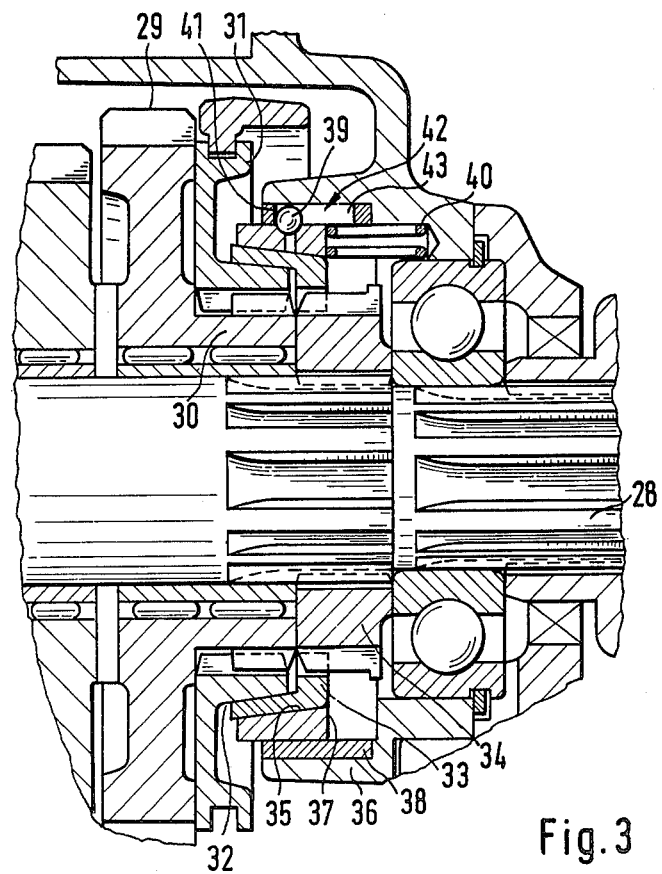
FIG. 3 is a partial axial cross-sectional view of a second embodiment in accordance with the present invention including a gear wheel clutchable with a sliding sleeve.

As shown in FIG. 3, a reverse gear wheel 29, freely rotatably mounted on a driven shaft 28, is provided with an elongated hub 30 with splines disposed on an outer circumference thereof for a sliding sleeve 31 which is provided with a conically-shaped or tapering frictional surface 32 for frictional engagement with a conically-shaped or tapering friction ring 33. The friction ring 33 is non-rotatably and axially displaceably mounted on a coupling or clutch ring 34 of the driven shaft 28 with the ring 34 being adjacent to the hub 30 of the gear wheel 29.

When the sliding sleeve 31 is displaced in the direction of the coupling or clutch ring 34, to produce a non-rotational connection between the gear wheel 29 and the coupling or clutch ring 34, the friction ring 33 cooperates with a frictional surface 35 provided on an inner cone of a dog 37 movably mounted upon an inner circumference of a housing neck 36. The dog 37 is slidably movably mounted by a sleeve 38 mounted in the housing neck 36 with balls 39 serving as locking elements in a manner described more fully in connection with the construction of FIG. 1.

Additionally, the dog 37, in an unloaded state, is pressed by a plurality of helical compression springs 40, distributed uniformly, with the balls 39 against guide surfaces 41, running in the circumferential direction, into openings 42 in the sleeve 38. Each guide surface 41 abuts an axially directed guide surface 43 in the circumferential direction corresponding to the direction of rotation which prevails on driven shaft 28 when the motor vehicle is moving forward.

Figure 4:
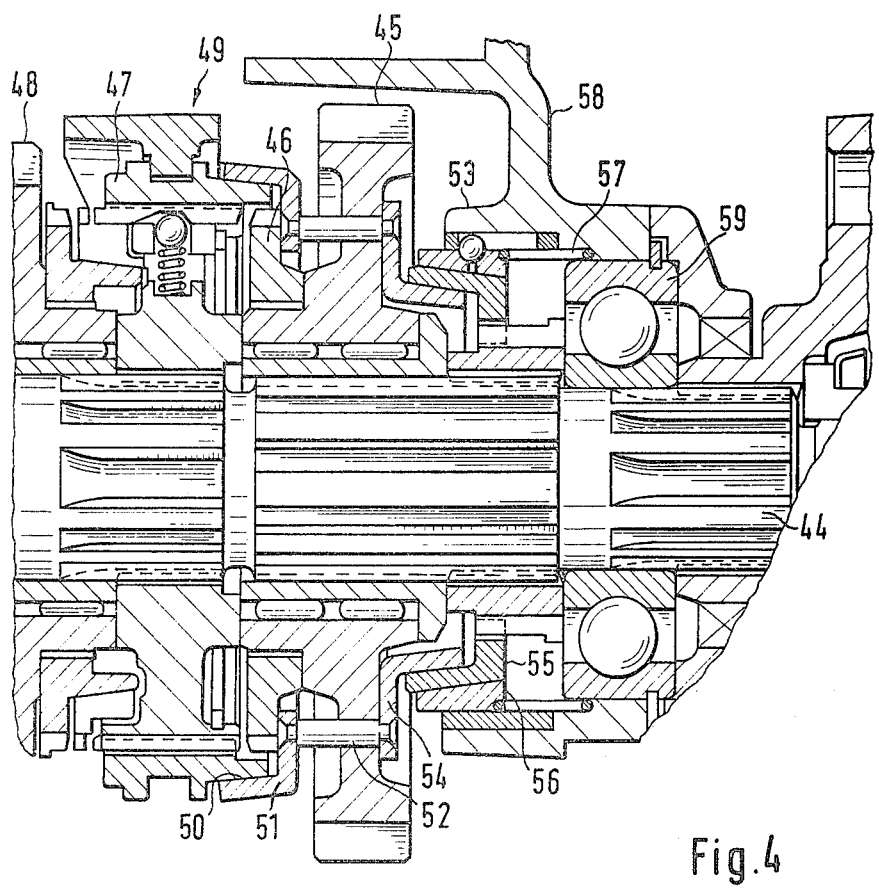
FIG. 4 is a partial axial cross-sectional view of a third embodiment in accordance with the present invention wherein a clutching element is provided to allow a shifting between a shift gear and a gear wheel of a forward speed.

As shown in FIG. 4, reverse gear wheel 45, freely rotatably mounted on a driven shaft 44, is fitted with a coupling element 46, non-rotatably connected to reverse gear wheel 45, for a sliding sleeve 47 of a shift coupling generally designated by the reference numeral 49 disposed between the gear wheel 45 and a gear wheel 48 of a forward gear. The gear wheel 48 can be associated, for example, with a high speed in the transmission. Sliding sleeve 47 cooperates with a first conical ring 51 by a frictional surface 50 with the ring 51 being non-rotatably connected by bolts 52 displaceably mounted in axial openings in the gear wheel 45, with a second conical ring 54 disposed on the side of the gear wheel 45 which faces a housing neck 53.

When sliding sleeve 47 is actuated to produce a non-rotational connection between shift coupling 49 and gear wheel 45, the second conical ring 54 comes into frictional engagement with an inner cone surface of the friction ring 55. The friction ring 55, non-rotatably and slidably connected with the driven shaft 44 by a shaped element cooperates, in turn, by means of an outer cone surface with a dog 56 disposed on the inner circumference of the housing neck 53 in a manner similar to the construction shown in FIG. 3. The dog 56 is supported against the housing 58 of the transmission by a single pre-tensioned helical compression spring 57, whereby helical compression spring 57 can be centered, for example, on a roller bearing 59.

Locking elements other than balls 11, 39, can be used for the locking device according to the present invention. Thus, for example, a dog slidably connected with a drive neck is possible with recesses extending out from a sliding surface thereof, which recesses are delimited by guide surfaces similar to the openings in the sleeves described hereinabove. Moreover, pins firmly anchored in the drive neck can extend into the recesses in the dog. Additionally, locking teeth of a conventional configuration could be provided and could function as locking elements of the locking device of the present invention.

While I have shown and described several embodiments in accordance with the present invention, it is understood that the same is not limited thereto, but is susceptible of numerous changes and modifications as known to a person skilled in the art, and I therefor do not wish to be restricted to the details shown and described herein, but intend to cover all such changes and modifications as are encompassed by the scope of the appended claims.

I claim:

1. A locking device for a reverse speed of a motor vehicle transmission, especially an automobile, the transmission including a transmission housing, a driven shaft, a friction ring adapted to be brought into frictional engagement with a reverse gear wheel when shifting into a reverse speed, the friction ring cooperating with a dog which is spring-loaded in an axial direction, the dog selectively displacing locking elements into a locking position for preventing engagement of the reverse gear wheel during predetermined operating conditions of the transmission, characterized in that the friction ring is non-rotatably and slidably mounted on the driven shaft between the gear wheel and the dog, the gear wheel is freely rotatably mounted on the driven shaft and is adapted to be selectively coupled thereto, and in that the dog is arranged on portions of the transmission housing so as to be coaxial with respect to the driven shaft.

2. A locking device according to claim 1, characterized in that the transmission housing includes a neck portion disposed coaxially to the driven shaft, a sleeve is non-rotatably connected with the neck portion of the transmission housing, the dog is slidably connected with the sleeve, and in that the sleeve is provided with at least one opening having guide surface means for guiding a movement of at least one of the locking elements.

3. A locking device according to claim 2, characterized in that a plurality of openings are provided in the sleeve spaced from each other in a circumferential direction, each of the openings includes guide surface means for guiding the movement of at least one locking element, and in that the locking elements are ball-shaped members interposed between the neck portion of the transmission housing and a portion of the dog.

4. A locking device according to claim 3, characterized in that the dog includes depressions for accommodating the ball-shaped members.

5. A locking device according to claim 4, characterized in that each of the guide surface means includes an axially directed guide surface, a further guide surface adjoining said axially directed guide surface and extending in a circumferential direction corresponding to a forward movement of the driven shaft, and a locking surface extending diagonally at least with respect to said further guide surface over at least a first linear portion thereof.

6. A locking device according to claim 5, characterized in that the gear wheel includes an inner cone portion having a frictional surface, the dog is arranged on an outer circumference of the neck portion of the transmission housing and includes a frictional surface along an outer circumference thereof, the friction ring includes a frictional surface along an inner and outer circumference thereof which respectively cooperate with the frictional surfaces on the dog and the gear wheel, a coupling ring is non-rotatably mounted on the driven shaft with the friction ring being disposed on the coupling ring, and in that, during a shifting operation of the transmission, the frictional surfaces of the gear wheel, friction ring and dog are brought into engagement with the dog being displaced in an axial direction along the neck portion of the transmission housing against biasing forces of compression springs when the locking device is ineffective, whereby the gear wheel meshes with a spline gearing of the coupling ring.

7. A locking device according to claim 5, characterized in that the dog is supported on an inner circumference of the neck portion of the transmission housing and cooperates with the friction ring by a frictional surface located on an inner circumference of the dog.

8. A locking device according to claim 7, characterized in that the gear wheel includes an axially extending elongated hub having splines disposed on an outer circumference thereof for engagement with splines provided on a sliding sleeve, the sliding sleeve including a frictional surface along an outer conical portion thereof, the friction ring is fashioned as a conical ring and is disposed on a coupling ring of the driven shaft, the friction ring includes a frictional surface engageable with the frictional surface of the sliding sleeve, and in that the coupling ring is arranged on the driven shaft adjacent the elongated hub and cooperates with the dog.

9. A locking device according to claim 7, characterized in that the gear wheel is provided with axial openings therein and a coupling means for a sliding sleeve of a shift gear disposed between the gear wheel and a gear of a forward speed, a first conical ring and a second conical ring are provided, said first and second conical rings being arranged on respective sides of the gear wheel, displaceably mounted pin means extend through the axial openings of the gear wheel for non-rotatably connecting the first conical ring with the second conical ring, the sliding sleeve is provided with a frictional surface cooperable with a portion of the first conical ring, and in that said second conical ring is brought into a frictional engagement with an inner conical portion of the friction ring during a shifting operation with the friction ring cooperating with an outer conical portion with the dog.

* * * * *